United States Patent [19]
Blakely

[11] Patent Number: 5,146,960
[45] Date of Patent: Sep. 15, 1992

[54] DELIMBING APPARATUS

[76] Inventor: Leslie J. Blakely, 1720 Thistlewaite Dr., Mobile, Ala. 36618

[21] Appl. No.: 819,968

[22] Filed: Jan. 13, 1992

[51] Int. Cl.[5] .............................................. B27G 1/00
[52] U.S. Cl. .................................. 144/2 Z; 144/2 AA; 144/343
[58] Field of Search ................... 144/2 AA, 2 Z, 3 D, 144/343

[56] References Cited

U.S. PATENT DOCUMENTS

| | | | |
|---|---|---|---|
| 3,805,858 | 4/1974 | Morin | 144/2 Z |
| 3,809,134 | 5/1974 | McCabe | 144/2 Z |
| 3,868,981 | 3/1975 | Nadeau | 144/2 Z |
| 4,067,367 | 1/1978 | Adamson | 144/2 Z |
| 4,111,245 | 9/1978 | McCrary et al. | 144/2 AA |
| 4,335,766 | 6/1982 | Davis et al. | 144/2 Z |
| 4,440,202 | 4/1984 | Everett | 144/2 Z |
| 4,823,850 | 4/1989 | Stream | 144/2 Z |

*Primary Examiner*—W. Donald Bray
*Attorney, Agent, or Firm*—Leon Gilden

[57] ABSTRACT

A tree delimbing structure is arranged to include a plurality of biased gates arranged in a first position in a parallel relationship relative to one another to a second position to receive a tree therethrough. The gates are hingedly mounted at opposed ends of the gate relative to confronting edges, wherein the confronting edges include aligned slots to receive a tree trunk therethrough to guide the tree trunk when the tree is directed rearwardly into the gate once the tree is passed through the gates. Biasing structure is provided to bias the gates to the first position from a second displaced position.

8 Claims, 5 Drawing Sheets

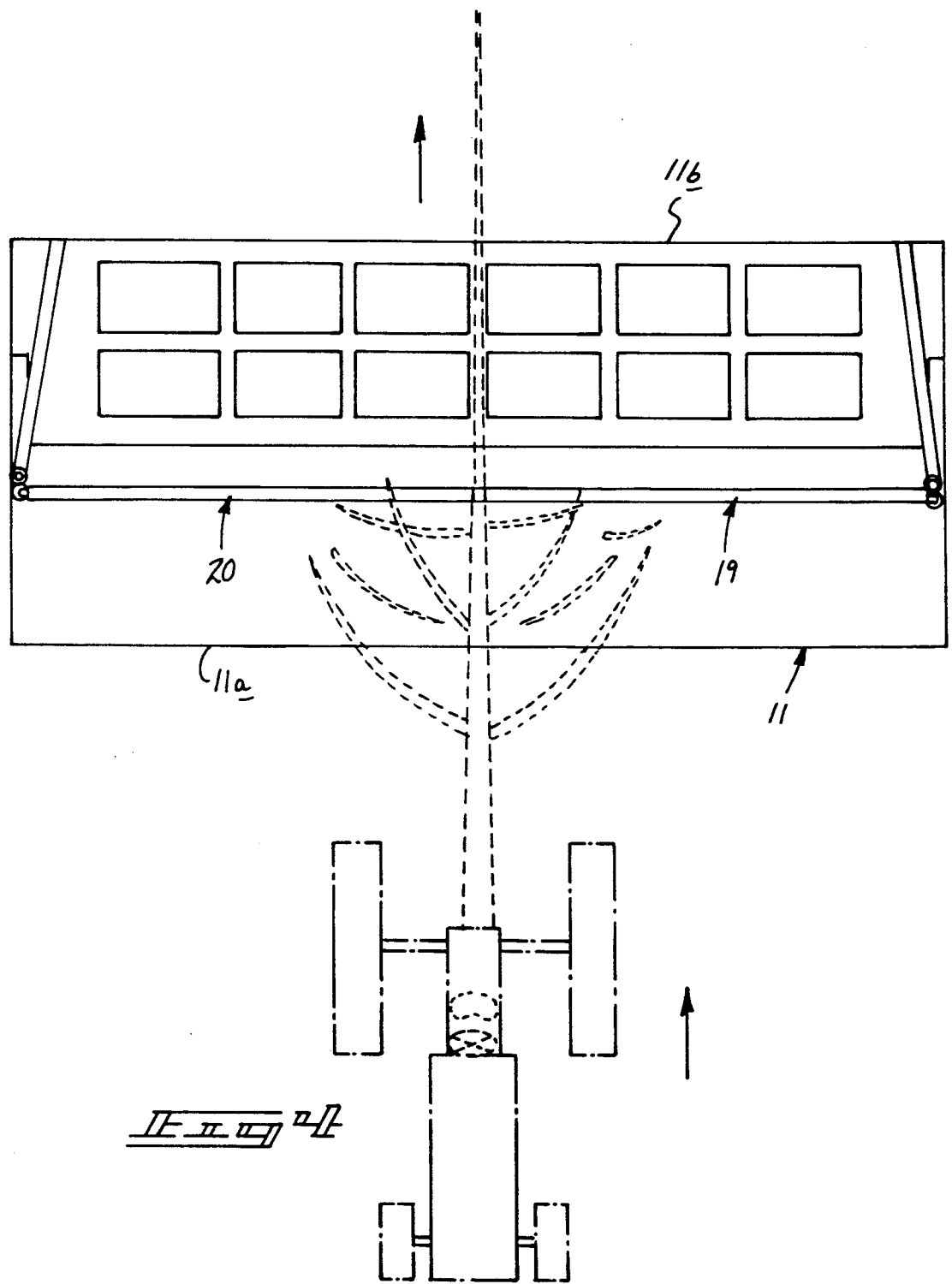

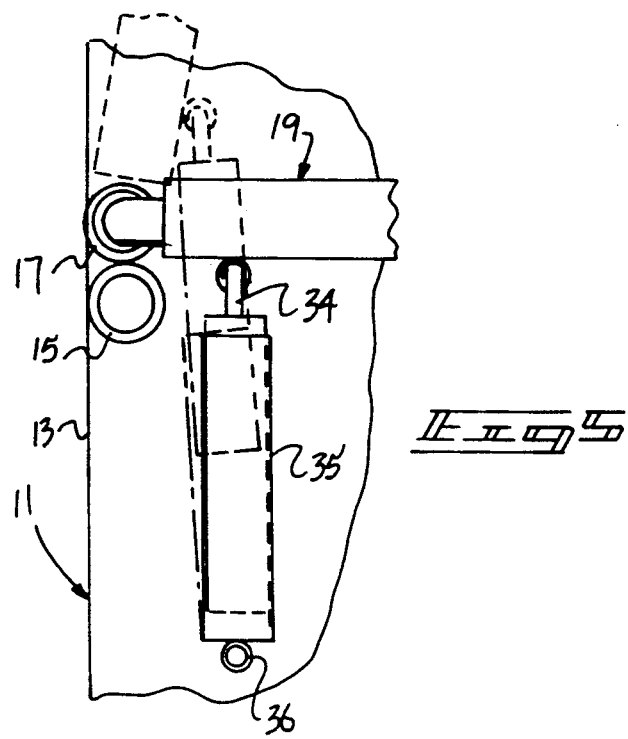
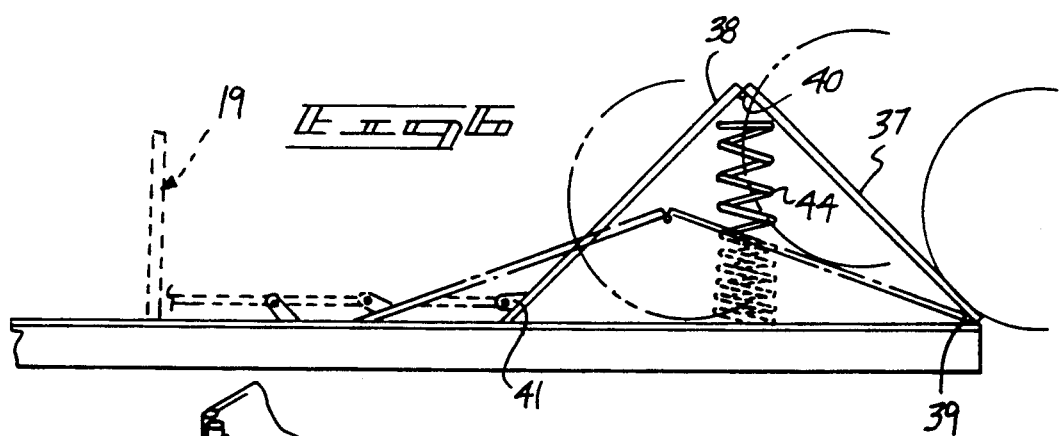
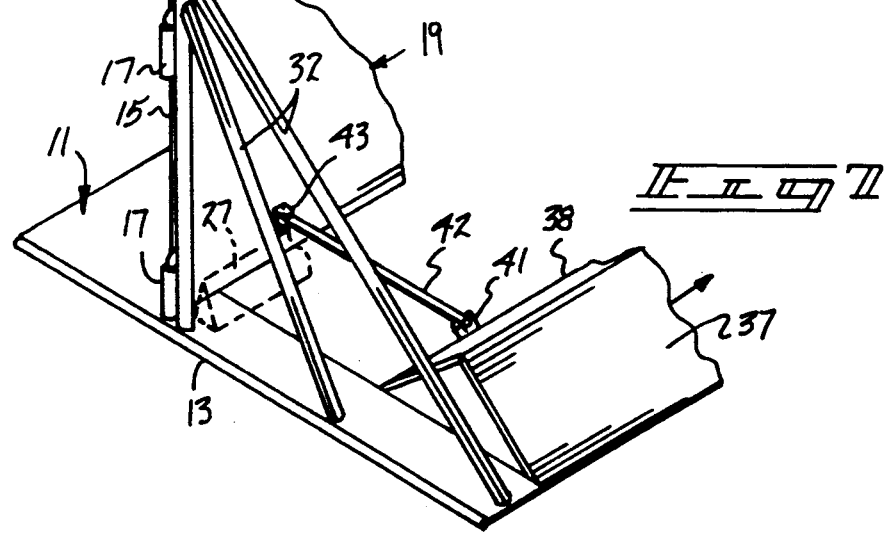

DELIMBING APPARATUS

BACKGROUND OF THE INVENTION

1. Field of the Invention

The field of invention relates to tree delimbing apparatus, and more particularly pertains to a new and improved delimbing apparatus wherein the same is directed to the ease and efficiency in the delimbing of a felled tree.

2. Description of the Prior Art

Subsequent to the felling of a tree, the tree is to be delimbed to permit ease of manipulation, transport, and storage of the tree as a log. Delimbing apparatus in the prior art has addressed this problem, but has frequently been of a cumbersome and awkward nature in use and construction. Examples of such tree delimbing apparatus are available in the prior art and U.S. Pat. No. 4,823,850 to Strean sets forth a pull-through delimbing apparatus disclosed for simultaneously delimbing a single or group of felled trees by directing the trees through jaw structure.

U.S. Pat. No. 4,898,218 to Linderholm sets forth a tree delimbing organization wherein cooperating jaws grasp a tree for the delimbing of a tree directed therethrough.

U.S. Pat. No. 4,738,292 to Turpeinen sets forth a tree delimbing apparatus wherein tree stems are longitudinally directed along a shaft then in turn utilizes helical blade structure for removing bark and branches from an associated tree.

Further examples of prior art are set forth in U.S. Pat. Nos. 4,919,175 to Samson and 4,719,950 to Peterson, et al., as further and varying examples of delimbing structure.

As such, it may be appreciated that there continues to be a need for a new and improved delimbing apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of delimbing apparatus now present in the prior art, the present invention provides a delimbing apparatus wherein the same is directed for the delimbing of a felled tree for subsequent manipulation and storage thereof. As such, the general purpose of the present invention, which will be described subsequently in greater detail, is to provide a new and improved delimbing apparatus which has all the advantages of the prior art delimbing apparatus and none of the disadvantages.

To attain this, the present invention provides a tree delimbing structure arranged to include a plurality of biased gates arranged in a first position in a parallel relationship relative to one another to a second position to receive a tree therethrough. The gates are hingedly mounted at opposed ends of the gate relative to confronting edges, wherein the confronting edges include aligned slots to receive a tree trunk therethrough to guide the tree trunk when the tree is directed rearwardly into the gate once the tree is passed through the gates. Biasing structure is provided to bias the gates to the first position from a second displaced position.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved delimbing apparatus which has all the advantages of the prior art delimbing apparatus and none of the disadvantages.

It is another object of the present invention to provide a new and improved delimbing apparatus which may be easily and efficiently manufactured and marketed.

It is a further object of the present invention to provide a new and improved delimbing apparatus which is of a durable and reliable construction.

An even further object of the present invention is to provide a new and improved delimbing apparatus which is susceptible of a low cost of manufacture with regard to both materials and labor, and which accordingly is then susceptible of low prices of sale to the consuming public, thereby making such delimbing apparatus economically available to the buying public.

Still yet another object of the present invention is to provide a new and improved delimbing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an orthographic top view of the invention directing a felled tree rearwardly into the gate structure of the invention.

FIG. 5 is an orthographic top view of an example of a biasing structure to direct the gates and bias the gates to the first position.

FIG. 6 is an orthographic side view of a further example of a biasing structure to bias the gate structures in the first position.

FIG. 7 is an isometric illustration of the biasing structure as set forth in FIG. 6.

DESCRIPTION OF THE PREFERRED EMBODIMENT

Figure 1:
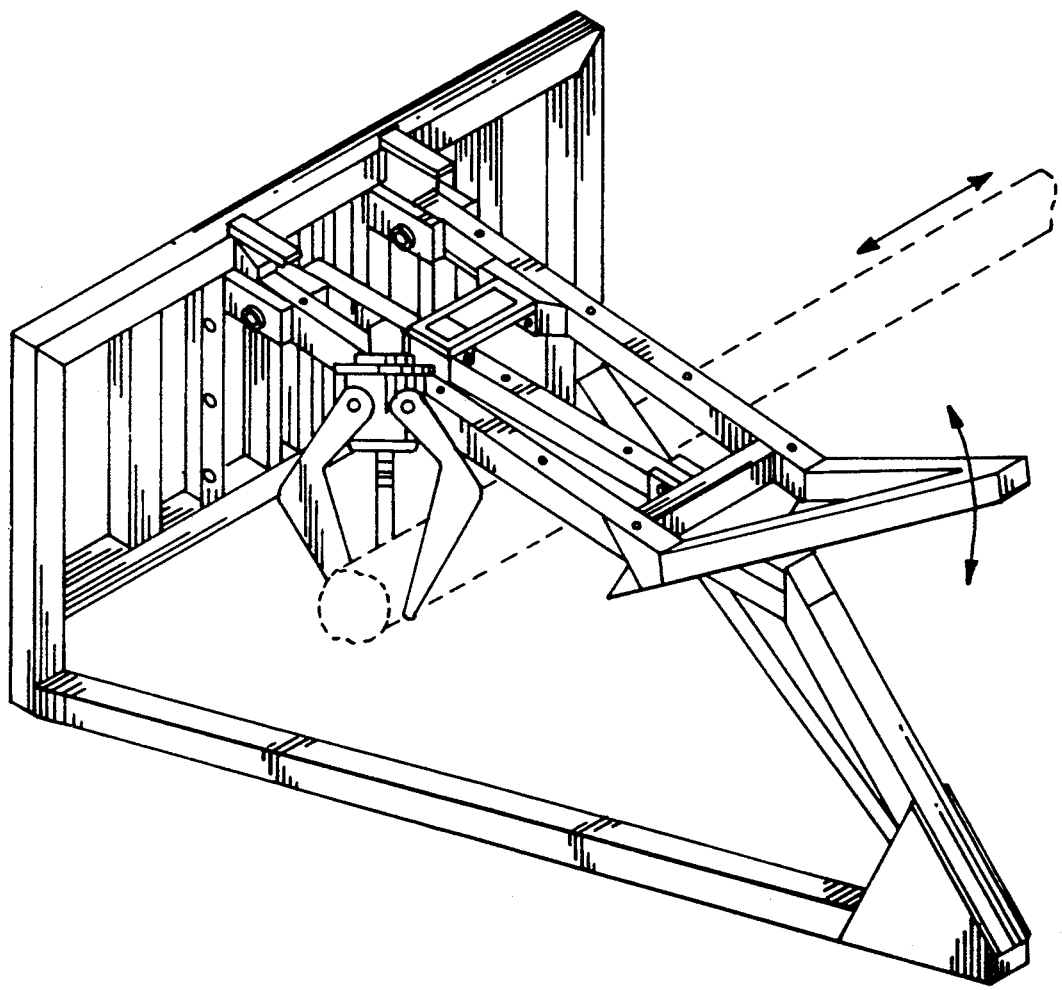
FIG. 1 is an isometric illustration of a prior art delimbing apparatus.
Figure 2:
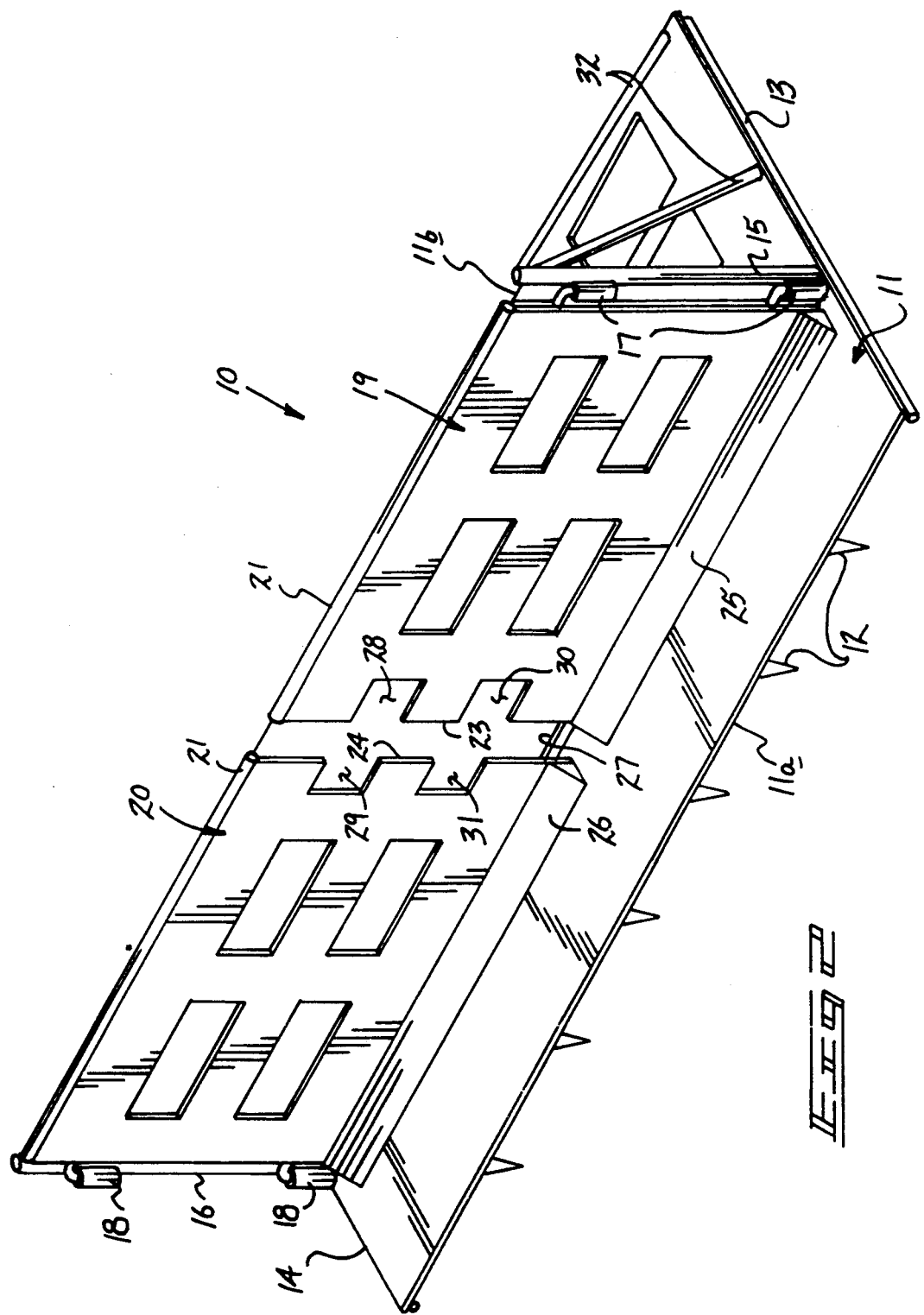
FIG. 2 is an isometric illustration of the instant invention.
Figure 3:
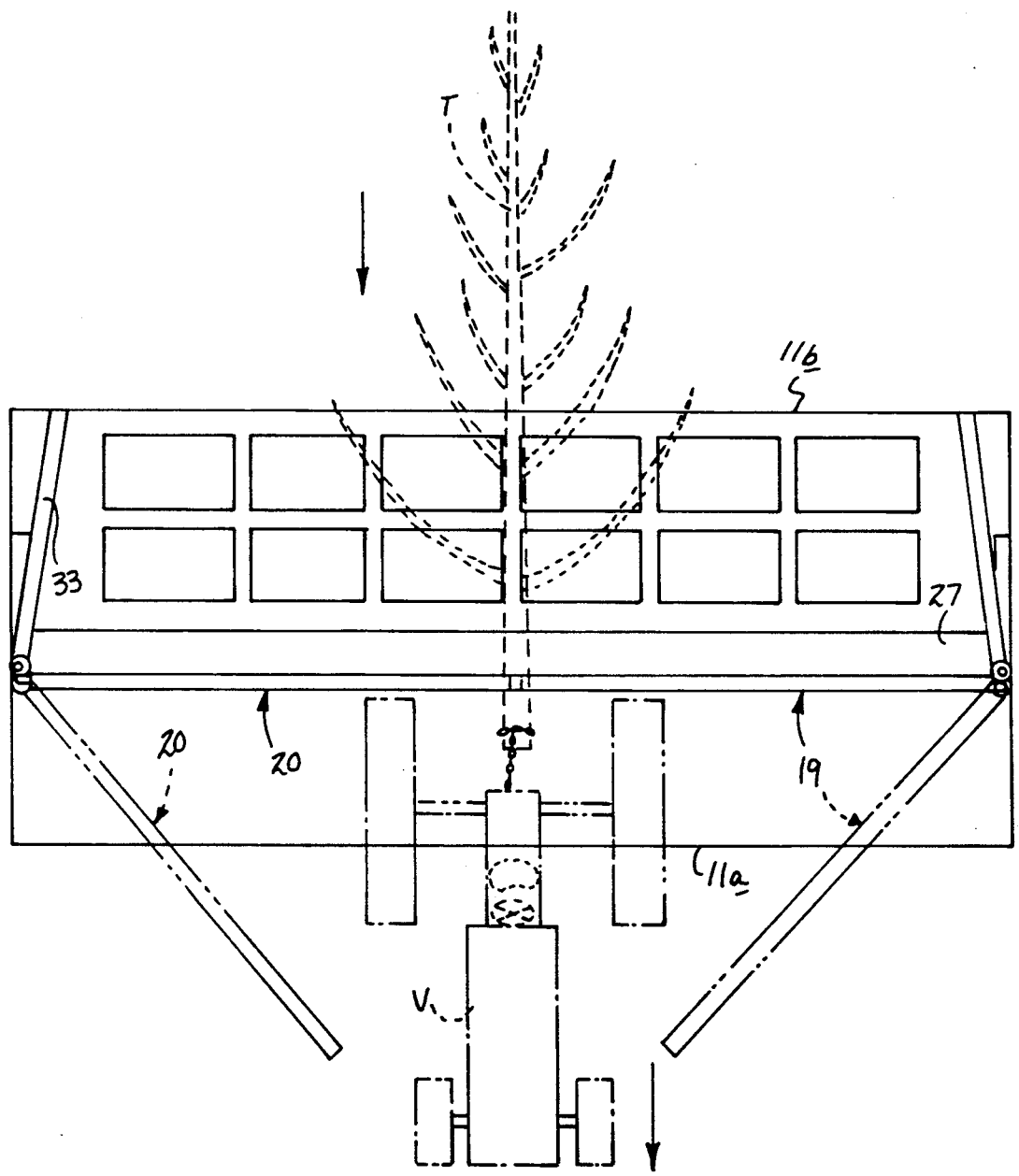
FIG. 3 is an orthographic top view of the invention illustrated in a first position displaced to a second position, as illustrated in phantom.

With reference now to the drawings, and in particular to FIGS. 1 to 7 thereof, a new and improved delimbing apparatus embodying the principles and concepts of the present invention and generally designated by the reference numeral 10 will be described.

FIG. 1 illustrates a prior art delimbing apparatus directing a felled tree through spaced jaws, as set forth in U.S. Pat. No. 4,823,850.

More specifically, the delimbing apparatus 10 of the instant invention essentially comprises a platform base 11, including a base front edge 11a spaced from a base rear edge 11b, including respective first and second side edges 13 and 14. At least one row of spikes 12 are orthogonally and fixedly mounted to a bottom surface of the base adjacent the front edge 11a projecting downwardly to enhance adjacency of the base with an underlying surface.

First gate post 15 is orthogonally mounted to a top surface of the base 11 adjacent the first edge 13 spaced between the front and rear edges 11a and 11b. A second gate post 16 is in a like manner mounted to a top surface of the platform base 11 adjacent the second edge 14 spaced an equal distance relative to the front edge 11a as the first gate post 15. First and second gate hinges 17 and 18 respectively are mounted to the respective first and second gate posts 15 and 16 and may be of a spring return type, wherein the hinges 17 and 18 are mounted to respective first and second gates 19 and 20 at exterior edges of the first and second gates 19 and 20. Each gate 19 and 20 includes respective first and second gate arcuate top edge 21 and 22 to permit ease of guidance of a tree limb or branch relative to the top edge, including respective first and second gate slotted interior edges 23 and 24 that are in a confronting relationship in a first position, wherein the first and second gates 19 and 20 are coplanar relative to one another. A first gate ramp 25 and a second gate ramp 26 are mounted to a frontal surface and bottom edge of the respective first and second gates 25 and 26 to permit ease of projecting of a tree "T" rearwardly into the gate structure in the manner as illustrated in the FIG. 4 for example. An entrance ramp 27 is mounted coextensively between the first and second side edges 13 and 14 orthogonally oriented relative to the first and second edges, and positioned adjacent the gates 19 and 20 when in the first position. The gates 19 and 20 are displaced to a second position defining a generally acute angle therebetween when a tractor vehicle "V" directs a tree "T" between the gates 19 and 20 permitting the gates to swing in an opened orientation permitting the vehicle and tree to be directed therethrough, with the entrance ramp 27 permitting ease of guidance between the gates, as well as an abutment surface for the gates in the first position, in a manner as illustrated in the FIG. 3 and the FIG. 7 for example.

First and second gate slotted interior edges 23 and 24 define respective first and second slots 28 and 29 in aligned orientation and confronting relative to one another within the respective first and second gates, as well as a third and fourth slot 30 and 31 within the respective first and second gates that are also in aligned orientation when the gates are in a first position to guide a tree trunk between each pair of slots as desired, i.e. the first and second slots 28 and 29 or the third and fourth slots 30 and 31, wherein the branches are thereafter delimbed between the gates 19 and 20 that are generally in adjacency and about the interior edges 23 and 24. The first and second slots 28 and 29 as well as the third and fourth slots 30 and 31 may be in varying widths relative to the pairs of slots 28-29, or 30-31 to accommodate varying sizes of tree trunks therethrough. The gate posts 15 and 16 include respective first and second gate post braces 32 and 33 mounted from the gate posts rearwardly to the rear edge 11b to brace the gate structure on the tree and directed rearwardly, in a manner as illustrated in FIG. 4 for example.

The FIG. 5 illustrates the use of a return piston 34 that is pivotally mounted relative to each gate rearwardly of each gate adjacent the associated gate post, with the piston reciprocated and biased within a cylinder 35 that is mounted to a pivot axle 36 at its rear distal end, with the pivot axle 36 mounted to the platform.

An alternative manner of biasing and assisting the gate to the first position is illustrated in the FIGS. 6 and 7, wherein a first actuator flange 37 is pivotally mounted to a second actuator flange 38 about a second hinge 40, with a first hinge 39 mounted to a rear distal end of the first actuator flange 37 that in turn is mounted coextensive with the rear edge 11b of the platform 11. The actuator flanges 37 and 38 may in this manner be substantially coextensive between the first and second edges 13 and 14. A first support clevis joint 41 is mounted to the second flange 38, with one such clevis joint oriented per each gate 19 and 20, wherein for purposes of illustration, only one such organization is illustrated, where it is understood that a mirror image of such construction is mounted adjacent the second gate 20. A second support clevis joint 43 is mounted to the first gate 19, as well as the second gate 20 to a rear surface thereof, with an actuator rod 42 secured between the first and second clevis joints 41 and 43. A biasing spring 34 is mounted below the second hinge 40 between the second hinge 40 and a top surface of the platform 11 to bias the first and second actuator flanges 37 and 38 upwardly relative to the top surface of the platform base and thereby bias the associated gate rearwardly in association with the spring hinge construction 17, as well as with the spring hinge construction 18 relative to the second gate 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A delimbing apparatus, comprising,
   a platform base, the platform base including a base bottom surface and a base top surface, and
   a base front edge spaced from a base rear edge, and
   a first side edge spaced from a second side edge, and
   a first gate post mounted fixedly and orthogonally adjacent the first side edge between the front edge and the rear edge, and
   a second gate post mounted adjacent the second side edge between the front edge and the rear edge, wherein the first gate post and the second gate post are spaced from the front edge a predetermined distance, and
   the first gate post including at least one gate hinge, and the second gate post including at least one second gate hinge, and
   a first gate mounted to the first gate hinge, and a second gate mounted to the second gate hinge, and the first gate and the second gate are in a coplanar relationship in a first position orthogonally oriented relative to the first side edge and the second side edge, and wherein the first gate and the second gate are displaced to define a generally acute included angle therebetween when the first gate and the second gate are displaced forwardly relative to the first gate post and the second gate post.

2. An apparatus as set forth in claim 1 wherein the platform base includes a plurality of spikes mounted to the bottom surface of the platform base adjacent the base front edge.

3. An apparatus as set forth in claim 2 wherein the first gate hinge and the second gate hinge are spring hinges to bias the first gate and the second gate in a first position.

4. An apparatus as set forth in claim 3 wherein the first gate includes a first gate arcuate top edge and the second gate includes a second gate arcuate top edge to permit ease of projection of a tree member about the first gate top edge and the second gate top edge.

5. An apparatus as set forth in claim 4 wherein the first gate includes a first gate slotted interior edge and the second gate includes a second gate slotted interior edge, wherein the first gate interior edge and the second gate interior edge are in a confronting adjacency relative to one another in the first position, and the first gate interior edge includes a first slot and third slot, and the second gate interior edge includes a second slot and a fourth slot, wherein the first slot and the second slot are aligned relative to one another, and the third slot and the fourth slot are aligned relative to one another in the first position.

6. An apparatus as set forth in claim 5 including an entrance ramp extending between the first gate post and the second gate post coextensively therebetween to provide an abutment for the first gate and the second gate in the first position.

7. An apparatus as set forth in claim 6 wherein the first gate includes a first gate ramp fixedly mounted to a forward surface of the first gate formed to a bottom edge of the first gate, the second gate includes a second gate ramp mounted to a forward surface of the second gate and to a bottom edge of the second gate, wherein the first gate ramp and the second gate ramp permit ease of directing of a tree member into the first slot and the second slot, or alternatively into the third slot and the fourth slot.

8. An apparatus as set forth in claim 7 wherein a first actuator flange includes a first flange first edge, the first flange first edge mounted in adjacency relative to the base rear edge, and a first spring mounted to the first flange first edge and the base rear edge to pivotally mounted the first actuator flange relative to the platform base, and a first flange second edge is formed relative to the first actuator flange, wherein the first flange second edge is arranged parallel relative to the first flange first edge, and a second actuator flange, the second actuator flange including a second actuator flange first edge, the second actuator flange first edge and the first actuator flange second edge include a second hinge mounted therebetween to pivotally mount the second actuator flange relative to the first actuator flange, and the first gate and second gate each include a second clevis joint mounted to the first gate and the second gate, and the second actuator flange includes a first clevis joint positioned rearwardly of each second clevis joint, and an actuator rod mounted between the first clevis joint and the second clevis joint of the first gate, and between the first clevis joint and the second clevis joint of the second gate, and at least one biasing spring mounted between the platform base and the second hinge of the first actuator flange and the second actuator flange to bias the first actuator flange second edge and the second actuator flange first edge in a raised orientation relative to the platform base.

* * * * *